United States Patent
Duvaut et al.

(10) Patent No.: US 7,835,368 B2
(45) Date of Patent: Nov. 16, 2010

(54) SYSTEMS AND METHODS FOR MITIGATING THE EFFECTS OF UPSTREAM FAR-END CROSS TALK

(75) Inventors: Patrick Duvaut, Tinton Falls, NJ (US); Amitkumar Mahadevan, Eatontown, NJ (US); Pravesh Biyani, Raipur (IN); Shailendra Singh, Unnao (IN); Satyavardhan Maheshwari, Noida (IN)

(73) Assignee: Ikanos Communications, Inc., Fremont, CA (US)

( * ) Notice: Subject to any disclaimer, the term of this patent is extended or adjusted under 35 U.S.C. 154(b) by 146 days.

(21) Appl. No.: 12/123,925

(22) Filed: May 20, 2008

(65) Prior Publication Data

US 2009/0122855 A1 May 14, 2009

Related U.S. Application Data

(60) Provisional application No. 60/987,299, filed on Nov. 12, 2007.

(51) Int. Cl.
*H04L 12/28* (2006.01)
(52) U.S. Cl. ..................................... 370/397
(58) Field of Classification Search ............... None
See application file for complete search history.

(56) References Cited

U.S. PATENT DOCUMENTS

| | | | |
|---|---|---|---|
| 6,292,559 | B1 | 9/2001 | Gaikwad |
| 6,999,583 | B2 | 2/2006 | Valenti et al. |
| 7,023,908 | B2 | 4/2006 | Nordstrom et al. |
| 7,577,209 | B2 * | 8/2009 | Poon .......................... 375/267 |
| 2001/0004383 | A1 | 6/2001 | Nordstrom |
| 2006/0002462 | A1 * | 1/2006 | Park .......................... 375/232 |
| 2006/0056522 | A1 | 3/2006 | Tsatsanis |
| 2006/0227815 | A1 * | 10/2006 | Khan ......................... 370/535 |
| 2007/0004286 | A1 | 1/2007 | Hobbel |
| 2007/0110135 | A1 * | 5/2007 | Guess et al. ................ 375/148 |

OTHER PUBLICATIONS

Duvaut, R, et al., Adaptive Off-Diagonal MIMO Pre-Coder (ODMP) for Downstream DSL Self FEXT Cancellation, proceedings of GlobeCom, Nov. 25-28, 2007, Washington-DC, USA.

Bliss, D.W.,et al.,"Environmental issues for MIMO Capacity", IEEE transaction on Signal processing, vol-50, Issue 9, pp. 2128-2142, Sep. 2002.

(Continued)

*Primary Examiner*—Chi H Pham
*Assistant Examiner*—Fan Ng
(74) *Attorney, Agent, or Firm*—Thomas, Kayden, Horstemeyer & Risley, LLP

(57) ABSTRACT

A method is described for reducing self-induced far end crosstalk (self-FEXT) in a multiple input multiple output (MIMO) digital subscriber line (xDSL) system. An initial value for an off-diagonal multiple input multiple output canceller (ODMC) is derived while the ODMC is inactive and while in data mode. The method includes activating the initial ODMC and converging towards an steady-state value for the ODMC by performing an adaptive algorithm to maximize the Shannon's capacity of the system and to reduce upstream self-FEXT. Bit loading is performed and a frequency domain equalizer (FEQ) is updated.

25 Claims, 6 Drawing Sheets

OTHER PUBLICATIONS

G.993.2, Very High Speed Digital Subscriber Line Transceiver 2, VDSL2, Feb. 2006, ITU-T.

Wiese, B.R. & Chow, J.S., "Programmable Implementation of xDSL transceivers", IEEE Communication Magazine, vol. 38, Issue 5, May 2000.

Cendrillon, R. et al., "Partial Crosstalk Cancellation for Upstream VDSL", Eurasip Journal on Applied Signal Processing, 2004:10, pp. 1520-1535.

G. Ginis and J.M. Cioffi, "Vectored Transmission for Digital Subscriber Line Systems," IEEE J. Select. Areas Commun., vol. 20, No. 5, pp. 1085-1124, Jun. 2002.

R. Cendrillon et al., "Improved Linear Crosstalk Precompensation for DSL," in Proc. IEEE ICASSP, May 2004, pp. 1053-1056.

Actelis Networks, "Channel Estimation by 'Abuse' of Receivers," NIPPNAI-098, Savannah, Georgia, 2006.

J. Louveaux and A.J. Van Der Veen, "Error Sign Feedback as an Alternative to Pilots for Tracking of FEXT Transfer Functions in Downstream VDSL," EURASIP J. Applied Signal Processing, vol. 2006, pp. 1-14.

J. Louveaux and A.J. Van Der Veen, "Adaptive DSL Crosstalk Pre-cancellation Design Using Low-Rate Feedback From End Users," IEEE Signal Proc. Letters, vol. 13, No. 11, pp. 665-668, Nov. 2006.

Conexant Systems, "G.vdsl: Proposed Requirements on Back Channel for Estimating MIMO Channel in VDSL2", CD-041, Denver, Colorado, Sep. 25-29, 2006.

E. Karipidis et al., "Crosstalk Models for Short VDSL2 Lines from 30MHz Measured Data", Eurasip Journal on Applied Signal processing, vol. 2006, Article 85859, pp. 1-9.

Conexant Systems, "Updated Proposal for Construction of a MIMO Channel Model for Evaluation of FEXT Cancellation Systems," NIPPNAI-2007-009R1, San Francisco, California, 2007.

Conexant Systems, "G.vdsl: Using Error Samples for Downstream Self FEXT Cancellation Pre-coding in VDSL2," SD-052, San Diego, California, 2007.

A. Leshem and L. Youming, "A Low Complexity Coordinated FEXT Cancellation for VDSL" ICECS, Dec. 2004, pp. 338-341.

Upzide labs, "G.vdsl: Using orthogonal pilot sequences for assisting FEXT channel estimation in vector transmission.", ITU SD-036, San Diego, California Jan. 15-19, 2007.

Benveniste, Albert, "Adaptive Algorithms for Stochastic Approximations," Springer Verlag, New-York, 1990.

International Search Report and Written Opinion.

* cited by examiner

SYSTEMS AND METHODS FOR MITIGATING THE EFFECTS OF UPSTREAM FAR-END CROSS TALK

CROSS-REFERENCE TO RELATED APPLICATION

This application claims priority to, and the benefit of, U.S. Provisional Patent Application entitled, "SYSTEMS AND METHODS FOR CANCELING UPSTREAM FAR-END CROSS TALK," having Ser. No. 60/987,299, filed on Nov. 12, 2007, which is incorporated by reference in its entirety.

TECHNICAL FIELD

The present disclosure generally relates to communications systems and more particularly, relates to systems and methods for mitigating the effects of upstream far-end cross talk (FEXT) in a digital subscriber line (xDSL) system.

BACKGROUND

Digital subscriber line (xDSL) technology is a technology that has developed in recent years in response to the demand for high-speed Internet access. xDSL technology utilizes the communication medium of pre-existing telephone systems. Thus, both plain old telephone systems (POTS) and xDSL systems share a common line for xDSL-compatible customer premises. Similarly, other services such as time compression multiplexing (TCM) integrated services digital network (ISDN) can also share a common line with xDSL and POTS.

POTS services and xDSL services are deployed on non-overlapping frequency bands available on the communication medium. While there is generally little concern of cross-talk or other interference between POTS services and xDSL services, xDSL and TCM-ISDN often share a portion of the available bandwidth, thereby making xDSL services susceptible to cross-talk from TCM-ISDN services, and vice versa.

In the telecommunication art, the term "crosstalk" refers to interference that enters a message channel from one or more other channels through a path coupling the message channel with the interfering channels. Crosstalk can create annoyance in a voice system or errors in a data system. The degree in which crosstalk impacts the communication line will depend in part on such factors as the listener's hearing acuity, extraneous noise on the communication line, the frequency response of the coupling path, and the level of the disturbing signal.

There are generally two types of crosstalk mechanisms that are characterized, one being far end crosstalk (FEXT) and the other one being near-end crosstalk (NEXT). FEXT refers to electromagnetic coupling that occurs when the receiver on a disturbed pair is located at the far end of the communication line as the transmitter of a disturbing pair. Self-FEXT generally refers to interference caused by neighboring lines provisioned for the same type of service as the affected line, or "victim." In contrast, NEXT results from a disturbing source connected at one end of the wire pair which causes interference in the message channel at the same end as the disturbing source.

Allocations of wire pairs within telephone cables in accordance with service requests have typically resulted in a random distribution of pair utilization with few precise records of actual configurations. Because of the physical proximity of bundled cables (due to pair twisting, cable branching, cable splicing, etc.), crosstalk caused by the electromagnetic interference between the neighboring lines is often the dominating noise source in the transmission environment. In addition, due to pair twisting in cables where cable branching and splicing take place, a wire pair can be in close proximity to many different pairs spanning different portions of its length. At a telephone CO (central office), pairs in close proximity may carry diverse types of service using various modulation schemes, with considerable differences in signal levels (and receiver sensitivities) especially for pairs of considerably different lengths.

Both FEXT and self-FEXT (as well as NEXT) continue to be a problem in xDSL communication systems as crosstalk impacts overall performance. Current approaches to addressing crosstalk suffer from various perceived shortcomings such as increased design costs and inefficient use of computing resources. Therefore, a heretofore unaddressed need exists in the industry to address the aforementioned deficiencies and inadequacies.

SUMMARY

Briefly described, one embodiment, among others, includes a method for reducing self-induced far end crosstalk (self-FEXT) in a multiple input multiple output (MIMO) digital subscriber line (xDSL) system. The method comprises deriving an initial value for an off-diagonal multiple input multiple output canceller (ODMC) while the ODMC is inactive and while in data mode. The method further comprises activating the initial ODMC and converging towards an steady-state value for the ODMC by performing an adaptive algorithm to maximize the Shannon's capacity of the system and to reduce upstream self-FEXT. The method also comprises performing bit loading and updating a frequency domain equalizer (FEQ).

In accordance with certain embodiments, the initialization process may comprise determining a cross-correlation between error samples and received data comprising a known learning sequence. According to other embodiments, the initialization process may comprise setting the initial value of the ODMC to zero and performing an adaptive algorithm to converge towards a steady state initial value for the ODMC. According to yet other embodiments, the initialization process may comprise determining a cross-correlation between error samples and detected transmit data based on received samples. The initialization process may be performed either in data mode or in warm-up mode.

Another embodiment is a method that comprises performing a learning phase to derive both an initial off-diagonal multiple input multiple output canceller (ODMC) and an steady-state ODMC for a given tone frequency. The method further comprises passing upstream data through the steady-state ODMC to cancel self-FEXT.

Yet another embodiment is a system that comprises initialization logic for deriving an initial ODMC, logic for deriving a steady-state ODMC from the initial ODMC to reduce self-FEXT by utilizing an adaptive algorithm, wherein the ODMC is active. The system further comprises logic for performing bit loading and for updating a frequency domain equalizer (FEQ) when a signal-to-noise ratio (SNR) of the system rises above a pre-determined value for a predetermined duration in order to maximize channel capacity.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
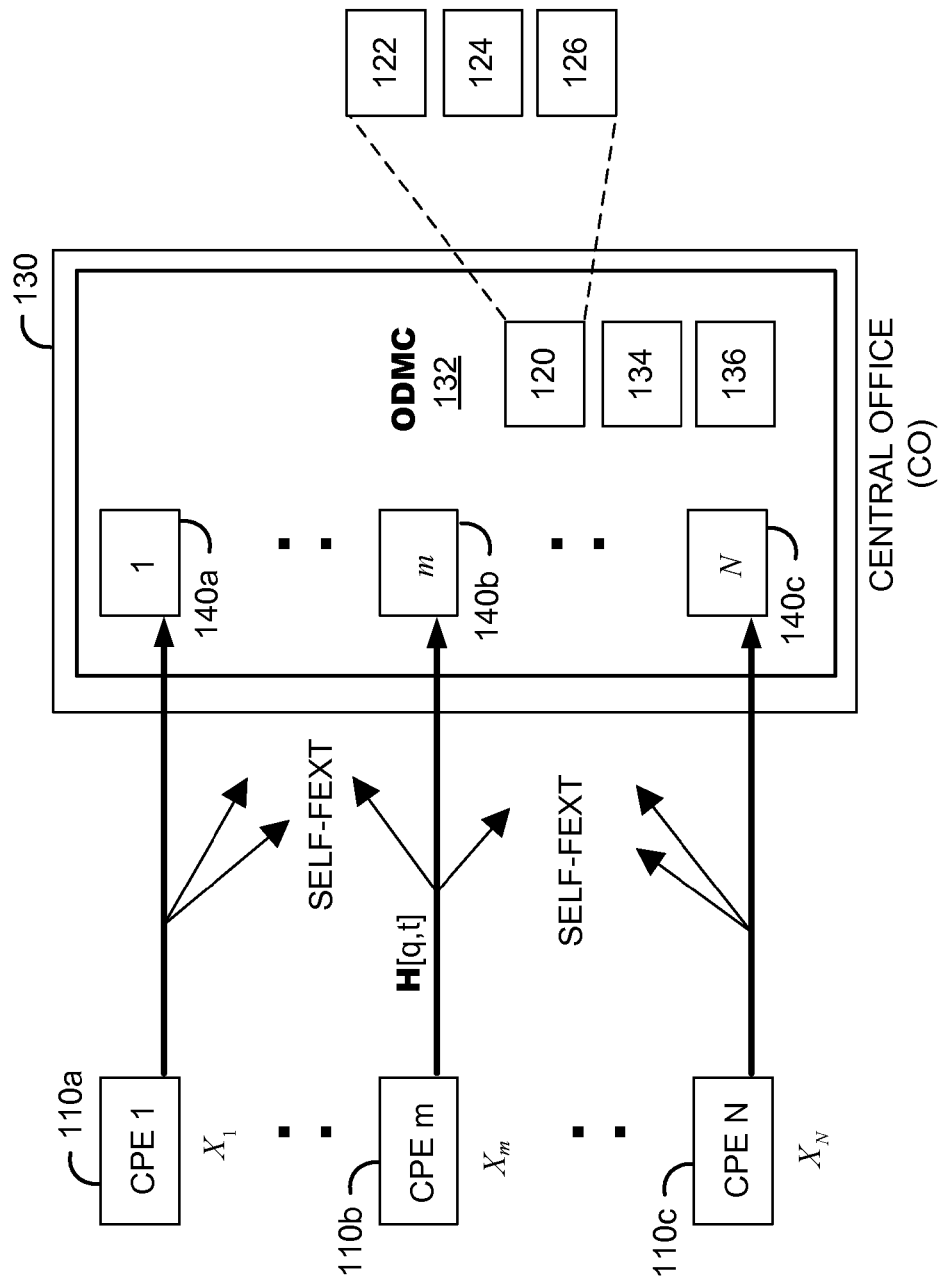
FIG. 1 illustrates an xDSL system in which embodiments of ODMC are applied.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Generally, self-induced FEXT can severely impact the performance of very high speed digital subscriber line services (VDSL) at the CO. Various embodiments of a linear off-diagonal MIMO canceller (ODMC) at the central office (CO) are thus described that mitigate self-induced far-end crosstalk (FEXT) in the upstream direction. The term "off-diagonal" is used to characterize the canceller as embodiments of ODMC are designed to cancel the off-diagonal coefficients, which represent self-FEXT. In accordance with exemplary embodiments, the ODMC operates on a per frequency basis and is well suited for DMT-based VDSL systems. A low complexity and low latency adaptive algorithm is described that converges towards an optimum, steady-state ODMC for canceling self-FEXT that simultaneously maximizes the distributed Shannon capacities of multiple upstream links based on various assumptions regarding the mode of operation of the VDSL system.

It should be noted that in accordance with exemplary embodiments of ODMC, matrix inversion operations, which are computationally intensive in nature, are avoided. Furthermore, simulation results, which will be discussed later, verify that near FEXT-free performance is achieved in steady state and that convergence towards an optimum ODMC can be achieved in a relatively low number of iterations (i.e., on the order of 100 iterations). The recursive scheme is initialized with a starting value based on the estimate of the off-diagonal coefficients of the MIMO xDSL channel that account for the FEXT disturbances. The calculation of the initial value is performed in data mode and requires approximately 150 discrete multi-tone (DMT) symbols. From there, an optimum ODMC for both mitigating the effects of self-FEXT and maximizing the Shannon capacity for the particular upstream channel and tone is derived.

Various embodiments for incorporating an ODMC to mitigate the effects of self-FEXT are now described in detail. First, a system model which serves as the basic framework for the ODMC is described. The initial learning phase that the ODMC undergoes at the central office (CO) is also described whereby an initial value of the ODMC which serves as a starting point for the adaptive algorithm is derived. The recursive scheme described herein is utilized to perform adaptive learning of the ODMC.

General Notation, System Model, and Expression for ODMC

For purposes of nomenclature used herein, the number of VDSL users participating in vectored upstream self-FEXT cancellation is denoted by N. Reference is made to FIG. 1, which illustrates an xDSL system in which embodiments of ODMC are applied. As shown in FIG. 1, the MIMO xDSL channel is denoted by the [N, N] matrix H[q,t] at DMT-symbol time instant t and discrete frequency q. For the non-limiting DMT based xDSL system depicted in FIG. 1, there are N separate users (or N sets of CPE 110a, 110b, 110c) where each user 110a, 110b, 110c is referenced using an index m. The function x[q,t] is used to represent upstream data and in particular, an N×1 vectored upstream signal transmitted from a CPE in data mode. Finally, embodiments of MIMO linear cancellers described herein (i.e., ODMC) are expressed by the [N, N] matrix operator R[q,t] that contains only zero diagonal entries. An ODMC module 132, which performs cancellation of self-FEXT, is generally implemented within the CO 130.

The CO may include an xDSL access multiplexer (DSLAM), xDSL line cards 140a, 140b, 140c, and other equipment for interfacing with CPE 110a, 110b, 110c. In some embodiments, the xDSL line cards 140a, 140b, 140c may be incorporated into the ODMC module 132. The ODMC module 132 may further comprise initialization logic 120 configured to derive an initial ODMC from error associated with an upstream signal. Furthermore, the ODMC module 132 may also include logic 134 configured to perform an adaptive algorithm to converge toward an optimum ODMC until error covariance associated with the transmitted upstream signal is minimized and channel capacity associated with the upstream signal is maximized. The logic 134 may be further configured to perform the adaptive algorithm beginning with the derived initial ODMC. The ODMC module 132 may also include logic 136 for performing bit loading and updating of a frequency domain equalizer (FEQ) when a signal-to-noise ratio (SNR) of the system rises above a predetermined value.

In accordance with certain embodiments, the initialization logic 120 may be comprised of logic 122 for determining a cross-correlation between error samples and received data comprising a known learning sequence. According to other embodiments, the initialization logic 120 may be comprised of logic 124 for setting the initial value of the ODMC 132 to zero and performing an adaptive algorithm to converge towards a steady state initial value for the ODMC. According to yet other embodiments, the initialization logic 120 may be comprised of logic 126 for determining a cross-correlation between error samples and detected transmit data based on received samples. It should be noted that the logic for performing the processes described above can be implemented in software, hardware or a combination of software and hardware.

For some embodiments, the CO 130 may include a processor, a memory component (which may include volatile and/or nonvolatile memory components), and a data storage component that are communicatively coupled via a local interface. The local interface may have additional elements such as controllers, buffers (caches), drivers, repeaters, and receivers to enable communications. Further, the local interface may include address, control, and/or data connections to enable appropriate communications among the aforementioned components.

The processor may be a device for executing software, particularly software stored in the memory component. The processor can be any custom made or commercially available processor, a central processing unit (CPU), an auxiliary processor among several processors, a semiconductor based microprocessor (in the form of a microchip or chip set), a macroprocessor, or generally any device for executing software instructions.

The memory component can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component may incorporate electronic, magnetic, optical, and/or other types of storage media. One should note that some embodiments of the memory component can have a distributed architecture (where various components are situated remotely from one another), but can be accessed by the processor.

The software in memory component may include one or more separate programs, each of which includes an ordered listing of executable instructions for implementing logical functions. For example, the software in the memory component may include an operating system. Furthermore, the software residing in memory may include application specific software, which may further comprise the following: initialization logic 120 configured to derive an initial ODMC from error associated with an upstream signal, logic 134 configured to perform an adaptive algorithm to converge toward an optimum ODMC until error covariance associated with the transmitted upstream signal is minimized and channel capacity associated with the upstream signal is maximized, and logic 136 for performing bit loading and updating of a frequency domain equalizer (FEQ) when a signal-to-noise ratio (SNR) of the system rises above a pre-determined value. It should be noted that these modules can be implemented in software, hardware or a combination of software and hardware. The operating system may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component, so as to operate properly in connection with the operating system.

Figure 2:
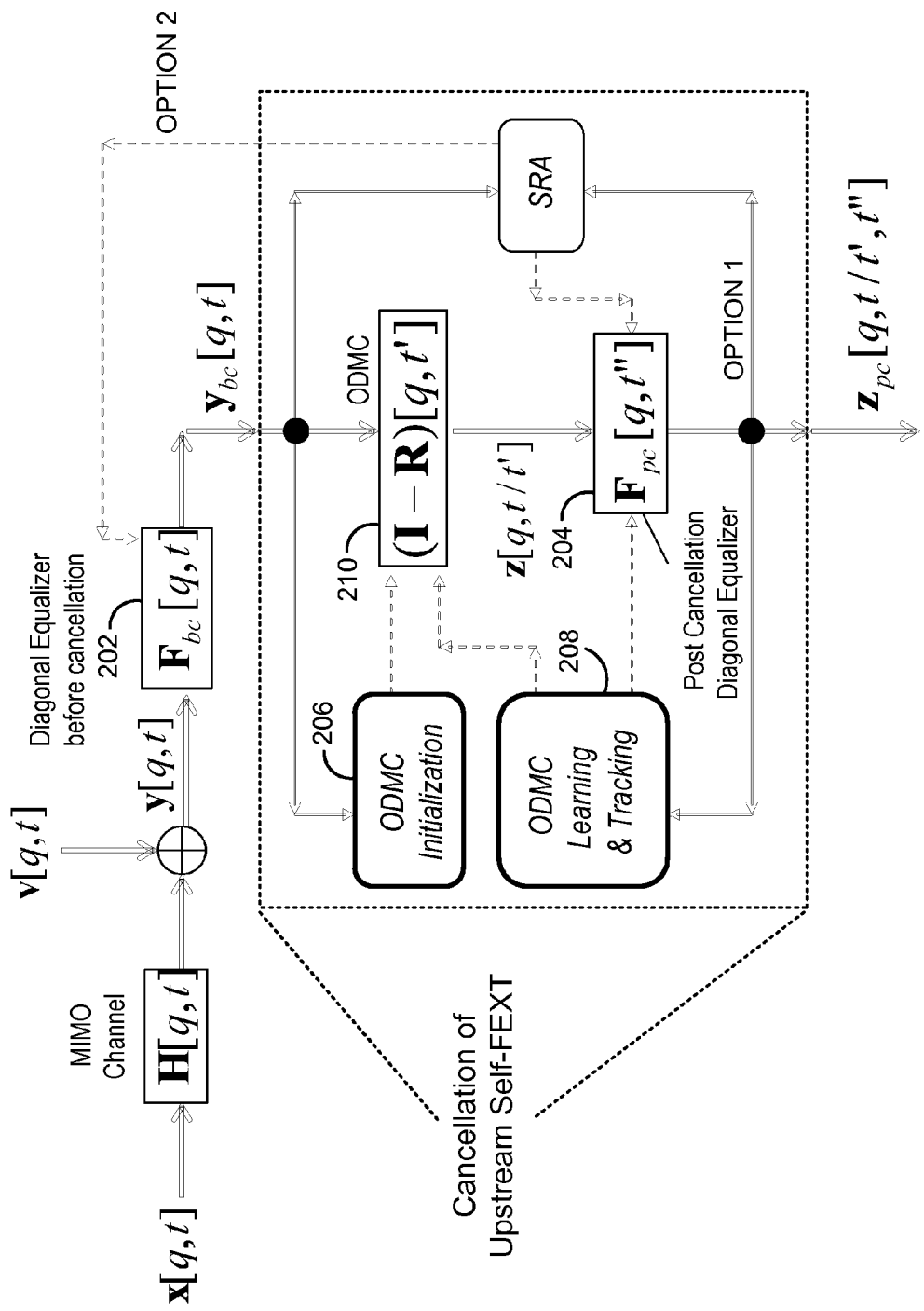
FIG. 2 depicts self-FEXT cancellation in the upstream direction using the ODMC depicted in FIG. 1 for tone q at DMT symbol time instant t.

Reference is now made to FIG. 2, which further illustrates the components of the ODMC module 132 depicted in FIG. 1. The function $H[q,t]$ represents the upstream N×N MIMO-DSL channel matrix, and $v[q,t]$ represents noise and specifically, an N×1 column noise vector experienced at the CO receiver. The N×1 received vectored signal in data mode at the CO after the FFT (fast Fourier transform) stage for tone q at DMT symbol time instant t is denoted as $y[q,t]$ and takes into account the noise vector $v[q,t]$. The function $y[q,t]$ can thus be defined as:

$$y[q,t]=(Hx+v)[q,t].\qquad\text{Equation 1}$$

In accordance with the central limit theorem, the noise vector $v[q,t]$ is Gaussian, complex circular, and has a zero mean. The covariance matrix is denoted by $\Gamma_v$ and is diagonal in nature when there is no cross talk from external sources (i.e., the absence of alien cross talk).

The MIMO Upstream channel matrix is expressed by the following:

$$H[q,t]=(H_d(I+C))[q,t]\qquad\text{Equation 2}$$

In the equation above, $H_d[q,t]$ is a diagonal matrix that represents the end-to-end direct line attenuation. The expression $H_d[q,t]$ is identical in the upstream and downstream directions because of the Maxwell reciprocity theorem. The expression $C[q,t]$ represents upstream self-FEXT and is represented as an off-diagonal N×N matrix (i.e., all diagonal entries within the matrix are equal to zero) that contains coupling coefficients between different transmitting pairs which cause self-FEXT in the upstream direction. It should be noted that the upstream and downstream off-diagonal self-FEXT matrices are different since the upstream and downstream leakage paths are different.

With further reference to FIG. 2, self-FEXT cancellation is achieved in the upstream direction by implementing an exemplary embodiment of an ODMC for a particular tone q at DMT symbol time instant t. Prior to commencing data mode and while in the presence of self-FEXT and in the absence of an Upstream Self-FEXT canceller, a diagonal frequency domain equalization (FEQ) matrix $F_{bc}[q,t]$ 202 is learned, as depicted in FIG. 2. For purposes of nomenclature, the "bc" subscript denotes "before cancellation." In data mode, the FEQ matrix $F_{bc}[q,t]$ is updated every DMT symbol time instant t and compensates for the diagonal entries of the MIMO channel such that $(F_{bc}H_d)[q,t]=I$, where I is an identity matrix. As a result, the N×1 equalized received vectored data sample without a self-FEXT canceller (denoted by $y_{bc}[q,t]$) is expressed as $$y_{bc}[q,t] \triangleq (F_{bc}y)[q,t] = ((I+C)x+w)[q,t],\qquad\text{Equation 3}$$

where w represents alien cross talk and $w=F_{bc}v=H_d^{-1}v$. Furthermore, the component $Cx$ shown in Equation 3 represents self-FEXT.

An upstream self-FEXT off-diagonal MIMO canceller (ODMC) is expressed in the form $(I-R)[q,t']$ when updated at DMT time instant t' ($t' \leq t$), where R is an N×N off-diagonal matrix. The ODMC operates on the current equalized vectored signal $y_{bc}[q,t]$ to yield an enhanced vectored signal $z[q,t/t']$ (with less self-FEXT) given as $$z[q,t/t'] \triangleq (I-R)[q,t']y_{bc}[q,t].\qquad\text{Equation 4}$$

where the enhanced vectored signal $z[q,t/t']$ is a function of both DMT time instant t and t'. For purposes of nomenclature, time instant t' is used to differentiate from time instant, t, which denotes the time instant when data transmission begins. Time instant t' denotes a time instant prior to this event. As such, it should be noted that exemplary embodiments for an ODMC is a function of t'.

When signal $y_{bc}[q,t]$ passes through the ODMC block 210 illustrated in FIG. 2, the result will generally contain diagonal components even though matrices R and C both have zero diagonal entries. As such, when R and C are multiplied together, the resulting diagonal components can be compensated for by further leveraging a "post canceller" (denoted by the subscript "pc") diagonal matrix equalizer $F_{pc}$ 104, as shown in FIG. 2. However, it should be noted that because of the complexity involved with FEQ $F_{pc}$ 204 and because the post canceller $F_{pc}$ 204 does not significantly change the asymptotic performance, the FEQ $F_{pc}$ can be bypassed without affecting performance. As such, FIG. 2 illustrates two options—Option 1 where a post-canceller FEQ $F_{pc}$ is leveraged; and Option 2 where the FEQ 102 is utilized only before the ODMC block.

It should be noted that Option 1 involves either solely relying on $F_{pc}$, thereby merging both $F_{pc}$ and $F_{bc}$ into $F_{pc}$, or relying on both cancellers, which is not economical from both a complexity and computational stand point (in terms of million instructions per second, or MIPS). The updating and/or learning phase of the FEQs subsequent to the activation of the self-FEXT canceller is automatically done in VDSL, depending on the selected option. Every standard compliant VDSL2 modem enters the seamless rate adaptation (SRA) operation as soon as the monitored noise margin crosses a pre-defined threshold for a sufficiently long duration. The SRA involves not only an update to the diagonal Frequency Domain Equalizer (FEQ) but also an update to the bit loading of all the tones that have experienced a sufficiently long and large margin change. This assures that the updated bit loading for a targeted nominal margin of 6 dB guarantees the maximum capacity while maintaining a bit-error-rate (BER) of at most $10^{-7}$ under new SNR conditions.

Since the diagonal matrix equalizer $F_{bc}[q,t]$ and the original bit loading has been learned with upstream self-FEXT but without the self-FEXT canceller, the margin will increase from a nominal value of 6 dB up to a stable value that depends upon how much SNR improvement the ODMC yields as soon as an ODMC is applied to the vectored signal $y_{bc}[q,t]$. Based on well accepted values, the SNR gain is usually well above 5 dB, which, in turn, is very likely to trigger the update and/or learning of the FEQ taps via the SRA.

In accordance with certain embodiments, the post canceller diagonal equalization matrix, $F_{pc}[q,t'']$, may be updated at a different DMT time instant t'', which is a time instant different than when the ODMC is updated (where $t'' \leq t$). As with time instant t', t'' denotes any time instant prior to time instant t, when data transmission begins. (The use of various time instants t' and t'' are used to convey that both the ODMC and the post canceller diagonal equalization matrix are calculated prior to processing received data.)

The final "soft" vectored information $z_{pc}[q,t/t',t'']$ passed to the trellis demodulation block used in VDSL [15] is:

$$z_{pc}[q, t/t', t''] \triangleq F_{pc}[q, t'']z[q, t/t'] \quad \text{Equation 5}$$
$$= F_{pc}[q, t''](I - R)[q, t']y_{bc}[q, t]$$

where $z_{pc}[q,t/t',t'']$ is a function of tone q and time instants t, t', and t''.

FIG. 2 provides a top-level view of an upstream self-FEXT cancellation scheme that utilizes an ODMC and a post-canceller diagonal equalizer that is automatically triggered by the SRA operation. The various steps for deriving an optimum ODMC are now described. While the system is running in data mode without any FEXT canceller active, an initial value of the ODMC, denoted as $R_{in}$, is calculated. The subscript "in" denotes "initial value." This calculation step is depicted by the "ODMC Initialization" block 206 shown in FIG. 2. The initialization ends at DMT symbol time instant $t_{in}-1$ where time instant $t_{in}$ denotes the time instant in which initialization is complete.

Initialization of the ODMC ($t_{datamode} \leq t \leq t_{in}$)

Due to bit loading table computations performed based on leveraging learning sequences (prior to data mode), the size of the QAM constellation to which each of the component of upstream vector belongs is known at the CO. This knowledge permits demapping of the equalized received vectored data signal $y_{bc}[q,t]$ to yield an N×1 "estimated" upstream transmit vectored QAM complex data sample, $x_{bc}[q,t]$, $$x_{bc}[q, t] \triangleq Demap\{y_{bc}[q, t]\} \quad \text{Equation 6}$$

It should be noted that because of the very low mandatory loading BER of $10^{-7}$ and 6 dB noise margin, the vectored symbol error rate (VSER) exhibited in the statistics of the difference between $x_{bc}[q,t]$ and the actual transmit QAM vectored point $x[q,t]$ (i.e., the actual data being sent) is small enough such that one can utilize the vectored decision, $x_{bc}[q,t]$, as a reliable reference. The above mentioned vectored difference is denoted $d_{bc}[q,t]$ and is expressed as follows:

$$d_{bc}[q, t] \triangleq (x - x_{bc})[q, t] \quad \text{Equation 7}$$

In the equation above, x represents the actual data being sent. The difference $d_{bc}[q,t]$ is driven by a Bernoulli process that indicates the occurrence of errors at particular DMT symbol time instants. Besides these time instants, the difference is zero. The value $x_{bc}$ can thus be used to calculate the vectored error (before cancellation) and is represented as:

$$e_{bc}[q, t] \triangleq (x_{bc} - y_{bc})[q, t] \quad \text{Equation 8}$$

The initial value $R_{in}$ of the ODMC is proportional to the average of the dyadic product between the vectored error and the vectored decision, $$R_{in}[q] = -\frac{1}{T\sigma_x^2}\sum_{k=1}^{T}(e_{bc}x_{bc}^H)[q, t_k], t_k < t_{in}, 1 \leq k \leq T \quad \text{Equation 9}$$

As shown above, $R_{in}$ is based on an average over a number of DMT symbols, T. It should be noted from Equations 3, 8 and 9 that $R_{in}$ is an unbiased estimate, $R_{in}=\hat{C}$, of the off diagonal FEXT channel matrix C under the assumption that the detection error $d_{bc}[q,t]$ is not correlated with the data. On the other hand, under the same assumptions, it turns out that because of the (very) small values of the elements of matrix C, $(I-R_{in})$ is an unbiased estimate of the first order approximation of the matrix $(I+C)^{-1}$ and, as such, may be viewed as a coarse zero-forcing MIMO equalizer which mitigates the effects of self-FEXT. Moreover, in the absence of any detection error across the averaging duration (i.e., $d_{bc}[q,t_k]=0$, $1 \leq k \leq T$), $R_{in}$ coincides with the maximum likelihood (ML) estimate of the matrix C, and therefore, achieves the Cramer-Rao Bound.

It should be noted that for the learning phase of the CPE, there are various options for deriving an initial value of the ODMC during data mode. As such, it should be noted that a steady-state ODMC is derived on the fly while in data mode. In some embodiments, an initial value may be derived strictly by performing a cross-correlation between error samples and data received at the CO from the CPE where the data comprises a learning sequence known by both the CO and the CPE. In other embodiments, the learning phase may comprise only an LMS adaptive algorithm to converge towards an optimum ODMC. That is, the initial value for the ODMC may be simply assigned a value of zero. In yet other embodiments, the CPE transmits data to the CO, and cross-correlation is performed on error samples and the received data. While the various techniques above for deriving an initial value of the ODMC are described in the context of data mode, it should be noted that in accordance with other embodiments, the techniques described above for deriving an initial ODMC may also be performed while the CPE is in warm-up mode.

Finally, it should be emphasized that Equation 9 above merely defines the initial value for the recursive algorithm that updates the ODMC and is not the final value that truly drives the SNR gain inherent to self-FEXT cancellation. The algorithm that adaptively completes the learning of the ODMC and eventually tracks the channel changes is now described in detail.

Adaptive Algorithm for Completion of Learning of the ODMC ($t_{in} \leq t$)

At symbol time instant $t_{in}$, the canceller is activated with the initial value $R_{in}$ calculated in the previous section and an adaptive algorithm is then performed to derive an optimum ODMC solution. This algorithm converges towards an optimum ODMC that concurrently minimizes the error variance of each upstream receiver without the need to perform any computationally intensive matrix inversions while converging towards an optimum solution. This algorithm also helps to track small changes to the MIMO channel. The learning and tracking phases are denoted by the ODMC Learning and Tracking block 208 in FIG. 2. The adaptation scheme also contributes to updating the post canceller diagonal equalizer in Option 1. For purposes of brevity, only Option 1, which activates the post-canceller FEQ, is described. The extension to Option 2 is straightforward and need not be discussed. Indeed, in Option 2, the learning/update phase of $F_{bc}[q,t]$ does not involve the canceller and thus relies on classical FEQ paradigm.

In keeping with Equation 5, the post canceller vectored error $e_{pc}[q,t/t',t'']$ is defined as:

$$e_{pc}[q, t/t', t''] \triangleq x_{pc}[q, t] - z_{pc}[q, t/t', t''] \quad \text{Equation 10}$$
$$\triangleq x_{pc}[q, t] -$$
$$F_{pc}[q, t''](I - R[q, t'])y_{bc}[q, t],$$

where $x_{pc}[q, t]$ designates the demapped soft vectored symbol $z_{pc}[q,t/t',t'']$, such that $$x_{pc}[q, t] \triangleq Demap\{z_{pc}[q, t/t', t'']\}. \quad \text{Equation 11}$$

Following Equation 10, the component of the vectored error computed on channel m, $1 \leq m \leq N$ is as follows:

$$e_{pc,m}[q,t/t',t''] = x_{pc,m}[q,t] - f_{pc,m}[q,t''](y_{bc,m}[q,t] - r_{-m}^T[q,t']y_{bc,-m}[q,t]) \quad \text{Equation 12}$$

In Equation 12 above, $f_{pc,m}[q,t'']$ denotes the $m^{th}$ diagonal entry of the N×N diagonal matrix $F_{pc}[q,t'']$, $r_{-m}^T[q,t']$ designates a 1×(N−1) row vector that collects the N−1 non zero entries of the $m^{th}$ row of matrix $R[q,t']$, $y_{bc,-m}[q,t]$ denotes a (N−1)×1 column vector containing all the components of $y_{bc}[q,t]$ that do not pertain to channel m.

Based on the form of the error given in Equation 12, an adaptive LMS-based algorithm is derived that converges towards the ODMC that simultaneously minimizes the variance of the distributed errors of the upstream receivers at the CO side. Furthermore, as discussed below, it should be noted that the algorithm described herein also converges towards the ODMC, while simultaneously maximizing the distributed Shannon capacities of the upstream links, provided that there is no detection error and provided the FEQ perfectly compensates for the diagonal terms of the MIMO-DSL channel. In particular, Equations 3 and 4 discussed earlier lead to the following equation for the $m^{th}$ component $z_m$, $1 \leq m \leq N$ of the enhanced vectored signal z as defined in Equation 4 earlier:

$$z_m = (1 - (RC)_{m,m})x_m + (c_{-m}^T - r_{-m}^T - \text{row}_{-m}\{(RC)_{nd}\})x_{-m} + (w_m - r_{-m}^T w_{-m}) \quad \text{Equation 13}$$

The Shannon Capacity $\omega_{z,m}$ of the $m^{th}$ mitigated upstream channel is derived directly from the equation above to yield:

$$\omega_{z,m} = \log_2 \left( 1 + \frac{|1 - (RC)_{m,m}|^2 \sigma_x^2}{\|c_{-m}^T - r_{-m}^T - \text{row}_{-m}\{(RC)_{nd}\}\|^2 \sigma_x^2 + \sigma_{w,m}^2 (1 - r_{-m}^T)\Gamma_{w,m}\begin{pmatrix}1\\-r_{-m}^*\end{pmatrix}} \right) \quad \text{Equation 14}$$

The noise covariance matrix is expressed as follows:

$$\Gamma_{w,m} \triangleq \begin{bmatrix} 1 & \gamma_{w,m}^H \\ \gamma_{w,m} & \Gamma_{w,-m} \end{bmatrix}, \quad \text{Equation 15}$$

$$\Gamma_{w,-m} \triangleq \frac{1}{\sigma_{w,m}^2} E[w_{-m}w_{-m}^H],$$

$$\gamma_{w,m} \triangleq \frac{1}{\sigma_{w,m}^2} E[w_{-m}w_m^*]$$

Now, assuming perfect diagonal equalization by the post-canceller and assuming that there are no detection errors, the following holds true for the error $e_{pc,m}$, $$e_{pc,m} = \frac{(r_{-m}^T + \text{row}_{-m}\{(RC)_{nd}\} - c_{-m}^T)x_{-m} + (r_{-m}^T w_{-m} - w_m)}{(1 - (RC)_{m,m})} \quad \text{Equation 16}$$

Combining the equations above yields the following equation for the Shannon's capacity $\omega_{z,m}$:

$$\omega_{z,m} = \log_2\left(1 + \frac{\sigma_x^2}{\text{VAR}[e_{pc,m}]}\right) \quad \text{Equation 17}$$

As such, the algorithm described herein converges towards an optimum ODMC while simultaneously maximizing the distributed Shannon capacities of the upstream links, provided that 1) there is no detection error and 2) that the FEQ perfectly compensates for the diagonal terms of the MIMO-DSL channel. These two assumptions are, however, easily met given that the mandatory BER value is $10^{-7}$ and considering the very long FEQ learning MEDLEY sequences recommended in VDSL standards.

The stochastic gradient paradigm leads to Equations 18 and 19 that define updates to the post canceller equalizer every DMT symbol and the self-FEXT canceller coefficients every K DMT symbols, for $1 \leq m \leq N$.

For $n \geq 0$ and $1 \leq i \leq K$:

$$f_{pc,m}[q,t_{nK+i}] = f_{pc,m}[q,t_{nK+i-1}] + \mu[t_{nK+i}](y_{bc,m}[q,t_{nK+i}] - r_{-m}^T[q,t_{nK}]y_{bc,-m}[q,t_{nK+i}])e^*_{pc,m}[q,t_{nK+i}/t_{nK},t_{nK+i-1}] \quad \text{Equation 18}$$

For $n \geq 0$:

$$r_{-m}[q,t_{(n+1)K}] = r_{-m}[q,t_{nK}] - \mu[t_{(n+1)K}]f_{pc,m}[q,t_{(n+1)K}] y_{bc,-m}[q,t_{(n+1)K}]e^*_{pc,m}[q,t_{(n+1)K}/t_{nK},t_{(n+1)K}] \quad \text{Equation 19}$$

The $m^{th}$ row $r_{-m}^{o,T}$ of the ODMC that simultaneously maximizes the distributed capacities $\omega_{z,m}$ of N upstream links is defined by the following equation:

$$[1 \mid -r_{-m}^{o,T}] = \frac{[1 \mid g_{-m}^H](C_m C_m^H + \alpha_m^2 \Gamma_{w,m})^{-1}}{[1 \mid g_{-m}^H](C_m C_m^H + \alpha_m^2 \Gamma_{w,m})^{-1} 1_1} \quad \text{Equation 20}$$

where the matrix $C_m$ represents an [N, N−1] matrix such that:

$$C_m \triangleq \begin{bmatrix} c_{-m}^T \\ I_{N-1} + C_{-m,-m} \end{bmatrix} \quad \text{Equation 21}$$

and where $C_{-m,-m}$ represents an [N−1, N−1] matrix where the $m^{th}$ row and $m^{th}$ column have been removed from the [N, N] matrix C. The associated maximum achievable capacities $\omega_{z,m}^o$, $1 \leq m \leq N$ can thus be expressed as follows:

$$\omega_{z,m}^o = \log_2\left(1 + [1 \mid g_{-m}^H](C_m C_m^H + \alpha_m^2 \Gamma_{w,m})^{-1}\begin{bmatrix} 1 \\ g_{-m} \end{bmatrix}\right) \quad \text{Equation 22}$$

This represents the theoretical maximum capacity reached by each upstream link after convergence of the adaptive ODMC.

Figure 3:
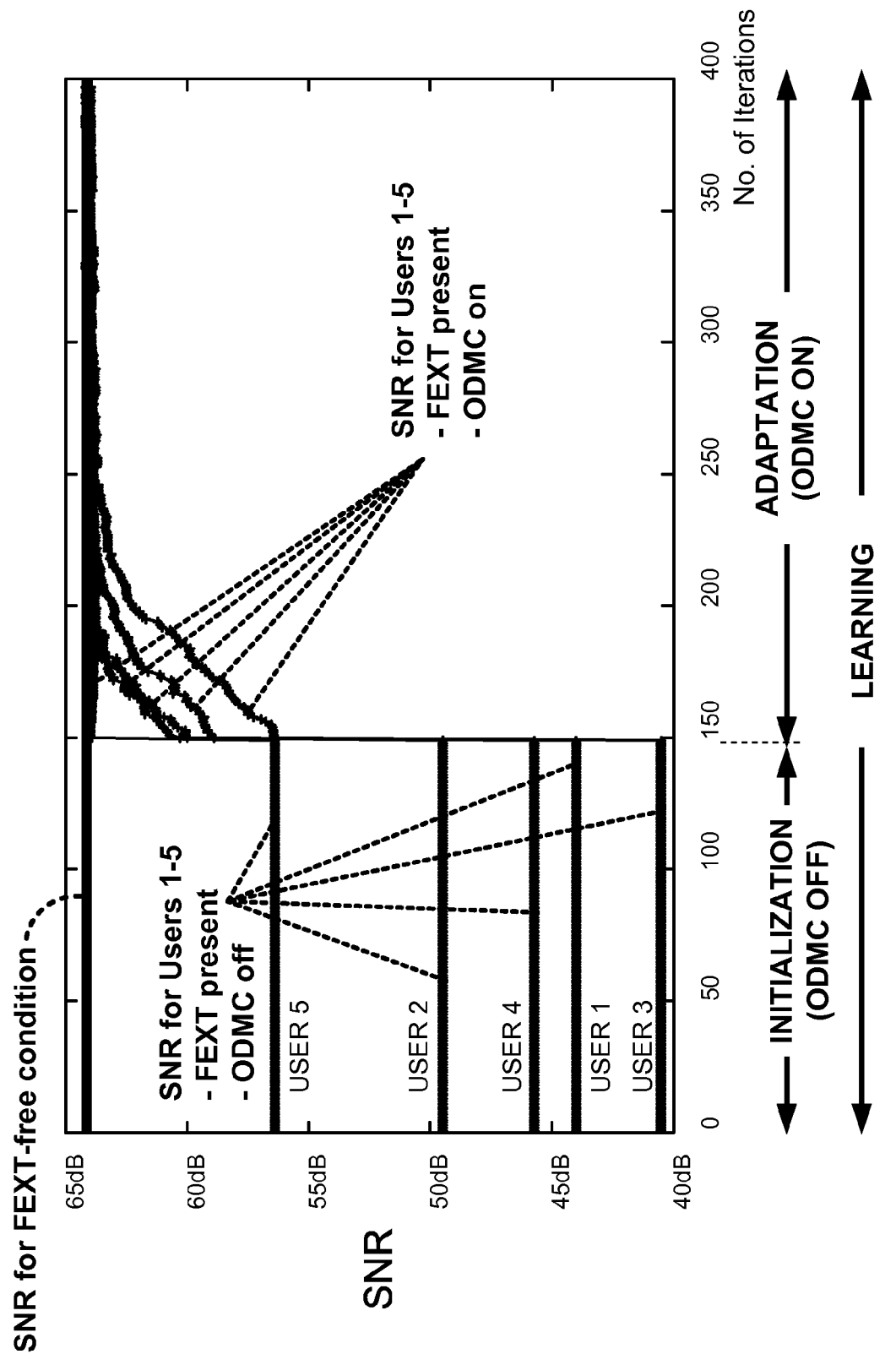
FIG. 3 shows the (signal-to-noise ratio) SNR for multiple sets of customer premises equipment during the entire learning phase of the ODMC depicted in FIG. 1 for a given tone.

Below, the increase in performance achieved through embodiments of the ODMC described above is shown through simulation results. It should be emphasized that the adaptive scheme described above does not require any matrix inversion and can also be used to track the variations of the channel. Reference is now made to FIG. 3, which shows the (signal-to-noise ratio) SNR for five users, or sets of customer premises equipment during the entire learning phase of the ODMC depicted in FIG. 1 for a 4 MHz tone. Each of the five users are connected through a 0.3 km loop. As discussed earlier, the learning phase associated with an exemplary ODMC is divided into an initialization phase and an adaptation phase. During the initialization phase, the ODMC is not yet engaged and an initial value, denoted by $R_{in}$, is derived using Equation 9 above.

As depicted in FIG. 3, the initialization phase ends at time instant $t_{in}-1$, or iteration 150 in FIG. 2. At iteration 151, the adaptive ODMC is activated and uses as its starting value, the value $R_{in}$ derived in the initialization phase. At this point, the recursive scheme described earlier is performed according to Equations 18 and 19. As seen in FIG. 3 and as should be noted, the adaptive algorithm fully converges in merely 100 iterations. This holds true for even the most affected user (from a standpoint of a lowest SNR prior to activating the ODMC), User 3.

Also shown in FIG. 3, after reaching steady state, the SNR associated with all the users is very close (within ~1 dB) to the SNR associated with a FEXT-free user. This is achieved if the only disturbance in the system is background noise and in the absence of any canceller. Equation 26 below provides the relative loss between the full MIMO capacity and the FEXT-Free capacity of the MIMO channel. The MIMO Upstream capacity achieved at discrete frequency q via the cooperation of the N receivers at the CO is as follows:

$$\omega_{MMO}[q] = \log_2|I + (\sigma_x^2 \tilde{H}\tilde{H}^H)[q]| \quad \text{Equation 23}$$

In the equation above, the operator |·| represents the determinant of the matrix argument. The variable $\tilde{H}$ designates the "whitened" MIMO channel, where:

$$\tilde{H} \triangleq \Gamma_v^{-\frac{1}{2}} H \quad \text{Equation 24}$$

In the equation above $$\Gamma_v^{-\frac{1}{2}}$$

denotes the inverse of the square root of the noise covariance matrix $\Gamma_v$. The matrix $\Gamma_v$ is always invertible since there is always white background noise. The (self) Fext-free (FF) capacity $\omega_{FF}[q]$ reflects zero cross coupling entries of the raw MIMO channel matrix H and is thus given by:

$$\omega_{FF}[q] = \log_2|I + (\sigma_x^2 \tilde{H}_d \tilde{H}_d^H)[q]| \quad \text{Equation 25}$$

In the equation above, $\tilde{H}_d$ represents the whitened diagonal channel, as per equation 23. The relative loss $$\delta_{MIMO-FF} \triangleq \frac{\omega_{MIMO} - \omega_{FF}}{\omega_{MIMO}}$$

between the MIMO capacity and the FEXT free capacity has an upper bound, which is represented by the following:

$$\frac{\omega_{MIMO} - \omega_{FF}}{\omega_{MIMO}} \leq \qquad \text{Equation 26}$$

$$\frac{\|C\|_F^2}{\sum_{m=1}^{N} \text{Log}(1 + \sigma_x^2 \tilde{\lambda}_{d,m})} \leq \frac{\lambda_{\text{Max}}\{CC^H\}}{\frac{1}{N}\sum_{m=1}^{N} \text{Log}(1 + \sigma_x^2 \tilde{\lambda}_{d,m})}$$

In the equation above, the term $\|C\|_F$ designates the Frobenius norm of matrix C; $\tilde{\lambda}_{d,m}$, $1 \leq m \leq N$ are the eigenvalues of the matrix $\tilde{H}_d \tilde{H}_d^H$. It should be noted that if there is no alien cross talk and if the background noise power is the same for all the channels (i.e., where $$\tilde{H}_d = \frac{1}{\sigma_v} H_d \Big),$$

then the relationship $$\tilde{\lambda}_{d,m} = \frac{|H_m|^2}{\sigma_v^2}$$

holds true.

As described herein, a CO-centric off-diagonal MIMO canceller (ODMC) may be utilized to mitigate the effects of upstream self-FEXT in VDSL systems. A low complexity and low latency recursive algorithm converges towards an optimum ODMC that not only address self-FEXT in the upstream direction but also maximizes the Shannon capacity for each upstream link at the same time. It should be noted that convergence towards an ODMC solution can be reached in a relatively low number of iterations (i.e., approximately 100 iterations) using an initial value that reflects the off-diagonal terms of the MIMO-DSL upstream channel matrix.

As shown in FIG. 3, even the most FEXT-impaired users experience an increase in SNR of more than 20 dB. In particular, the most impacted user (i.e., User 3) experiences an SNR improvement of approximately 23 dB—starting from an SNR of approximately 41 dB during the initialization phase (when the ODMC is not engaged) and increasing up to an SNR or 64 dB after an optimum ODMC is converged upon. Although the learning phase of the ODMC with a fixed channel has been described, it should be noted that the same adaptive scheme can also be used for other critical functions related to upstream self-FEXT mitigation such as tracking of channel changes and supporting the addition of new users that lead to an abrupt change of the channel dimensions.

Figure 4:
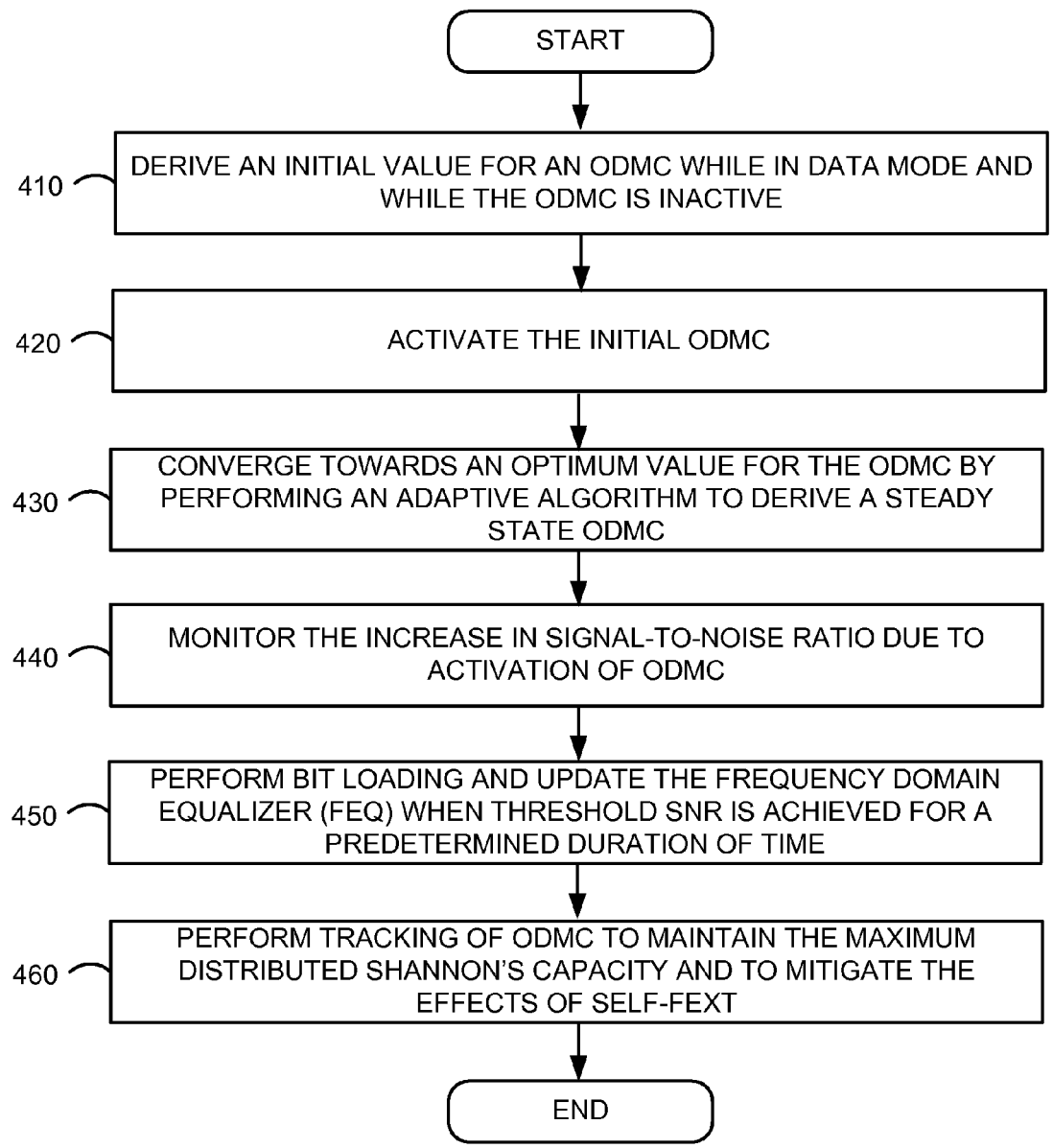
FIG. 4 is a flow diagram of an embodiment of a method for mitigating the effects of self-FEXT using the ODMC depicted in FIG. 1.

FIG. 4 is a flow diagram of an embodiment of a method for mitigating the effects of self-FEXT using the ODMC depicted in FIG. 1. Beginning in block 410, an initial value for an ODMC is derive during data mode and while the ODMC is inactive. In block 420, the derived ODMC is then activated. An adaptive algorithm is then performed to converge towards an optimum, steady state ODMC for mitigating the effects of self-FEXT (block 430). Due to activation of the ODMC, the signal-to-noise ratio (SNR) is expected to rise as the effects of self-FEXT are reduced. The SNR is monitored (440) and upon reaching a threshold value for a predetermined duration, bit loading is performed and the FEQ is updated (block 450). In accordance with some embodiments, tracking is then performed to ensure that an optimum ODMC is maintained (block 460), thereby maintaining the maximum distributed Shannon's capacity. This may be necessary due to changes in the channel, for example.

Figure 5:
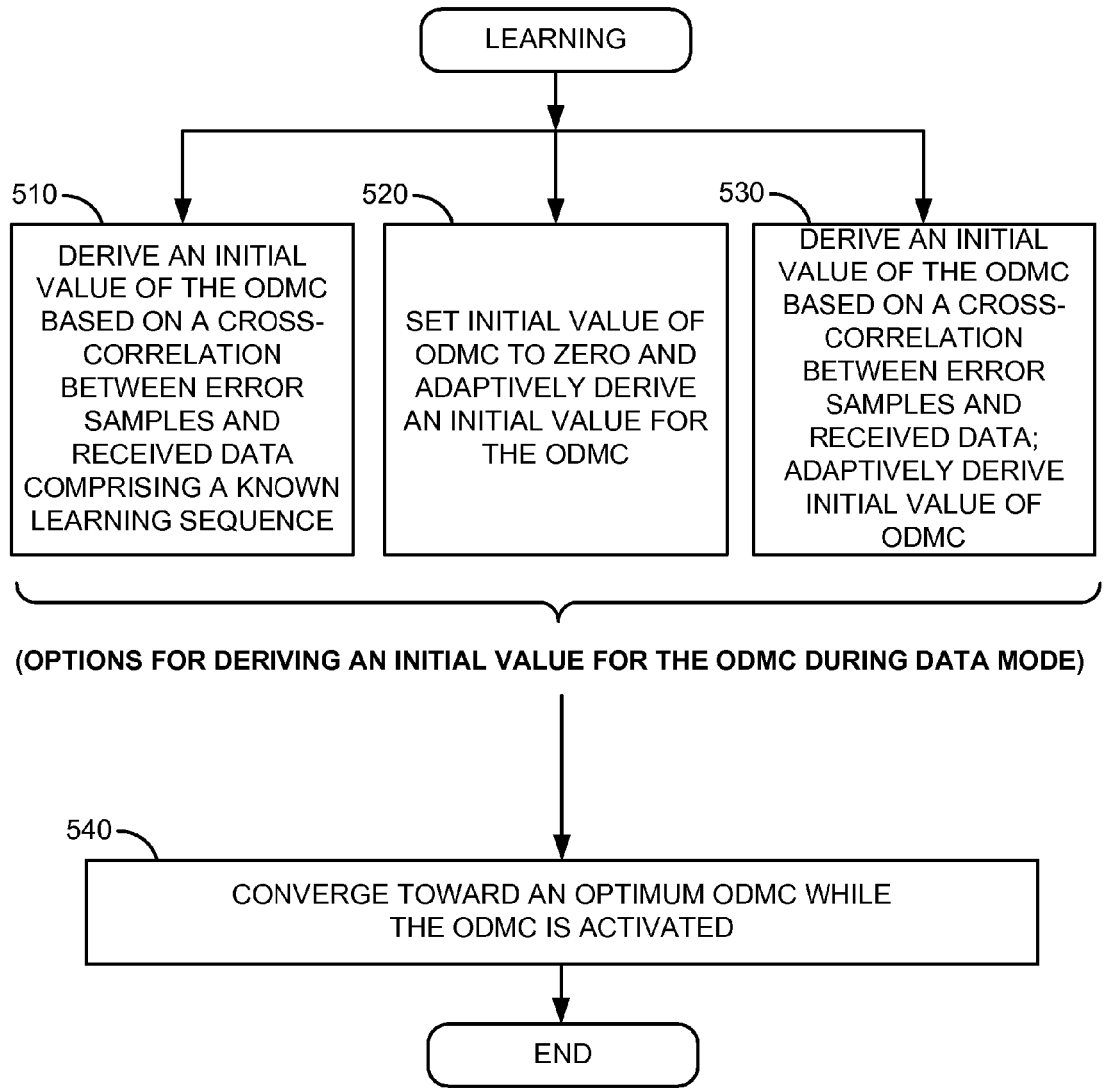
FIG. 5 is a flow diagram of various embodiments for performing initialization of the ODMC as depicted in FIG. 4.

FIG. 5 is a flow diagram of various embodiments for performing initialization of the ODMC as depicted in FIG. 4. As discussed above, block 410 in FIG. 4 begins by deriving an initial value for the ODMC while in data mode. As depicted in FIG. 5, there are various methods for deriving an initial ODMC, which serves as the starting point for converging towards an optimum ODMC. In accordance with certain embodiments, the initialization process may comprise determining a cross-correlation between error samples and received data comprising a known learning sequence (block 510). According to other embodiments, the initialization process may comprise setting the initial value of the ODMC to zero and performing an adaptive algorithm to converge towards a steady state initial value for the ODMC (block 520). According to yet other embodiments, the initialization process may comprise determining a cross-correlation between error samples and detected transmit data based on received samples (block 530). As depicted in FIGS. 4 and 5, an optimum ODMC is then derived while the ODMC is activated (block 540). As emphasized earlier, while the various methods above for deriving an initial ODMC are described in the context of data mode, the methods described above may also be performed while the end user/CPE is in warm-up mode. All such variations are intended to be within the scope of this disclosure.

Figure 6:
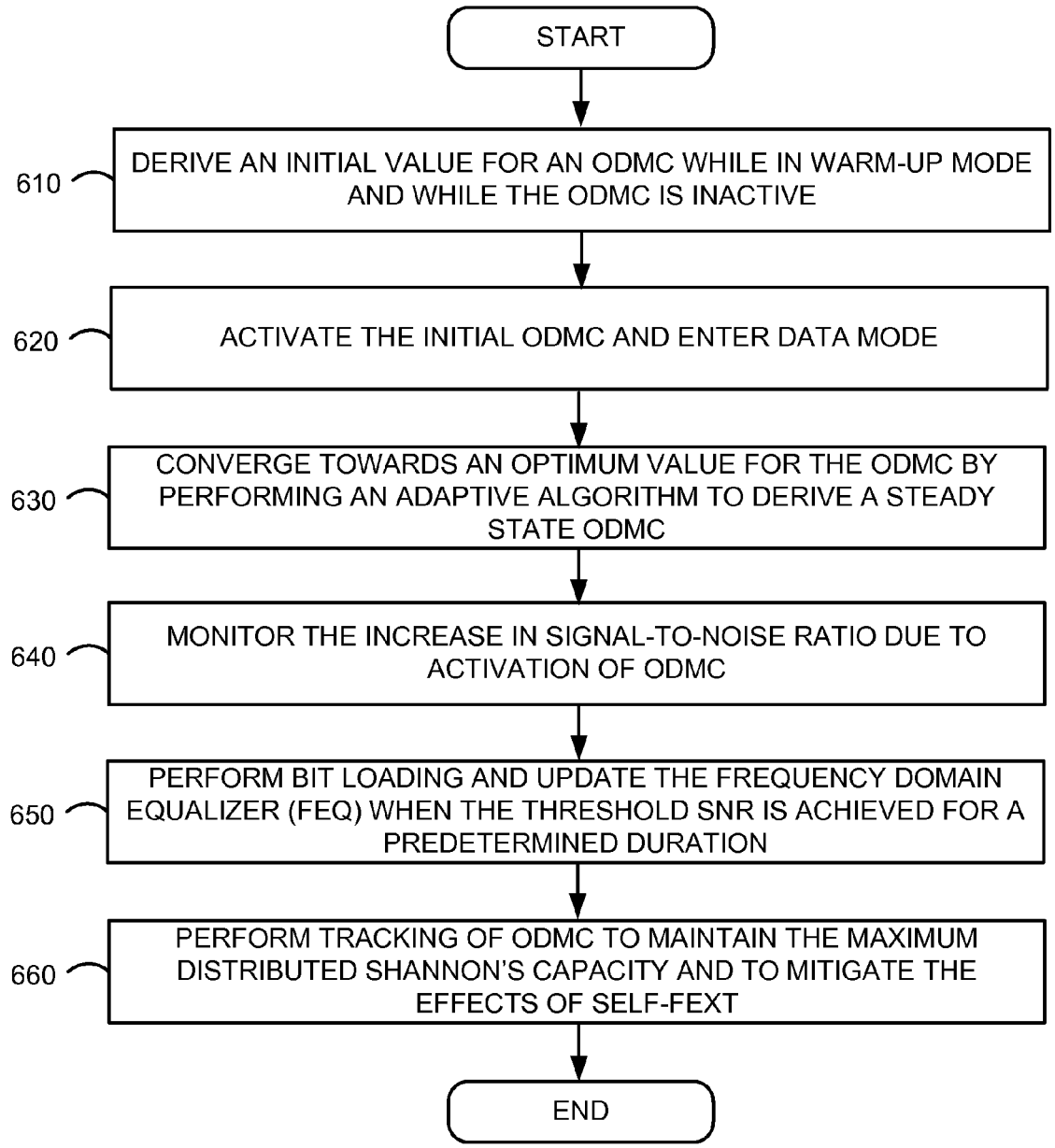
FIG. 6 is a flow diagram of an alternative embodiment of a method for mitigating the effects of self-FEXT using the ODMC depicted in FIG. 1.

Reference is now made to FIG. 6, which is a flow diagram of an alternative embodiment of a method for mitigating the effects of self-FEXT using the ODMC depicted in FIG. 1. In accordance with such embodiments, the initial ODMC is derived while the end user is in warm-up mode. Beginning in block 610, an initial value for an ODMC is derive during warm-up mode and while the ODMC is inactive. In block 620, the derived ODMC is then activated and the system transitions from warm-up mode to data mode, whereby data transmission begins. An adaptive algorithm is then performed to converge towards an optimum, steady state ODMC for mitigating the effects of self-FEXT (block 630). Due to activation of the ODMC, the signal-to-noise ratio (SNR) is expected to rise as the effects of self-FEXT are reduced. The SNR is monitored (640) and upon reaching a threshold value, bit loading is performed and the FEQ is updated (block 650). In accordance with some embodiments, tracking is then performed to ensure that an optimum ODMC is maintained (block 660), thereby maintaining the maximum Shannon's capacity. This may be necessary due to changes in the channel, for example.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method comprising:
    deriving an initial value for an off-diagonal multiple input multiple output canceller (ODMC) while the ODMC is inactive;
    activating the initial ODMC and converging towards a steady-state value for the ODMC by performing an adaptive algorithm to maximize a distributed Shannon's capacity of the system and to reduce upstream self-induced far end crosstalk (self-FEXT); and performing bit loading and updating a frequency domain equalizer (FEQ).

2. The method of claim 1, wherein reducing self-FEXT is performed for a discrete tone q and for a discrete multi-tone (DMT) time instant.

3. The method of claim 2, wherein the adaptive algorithm is expressed by the following:

$$f_{pc,m}[q,t_{nK+i}]=f_{pc,m}[q,t_{nK+i-1}]+\mu[t_{nK+i}](y_{bc,m}[q,t_{nK+i}]-r_{-m}^T[q,t_{nK}]y_{bc,-m}[q,t_{nK+i}])e_{pc,m}^*[q,t_{nK+i}/t_{nK},t_{nK+i-1}] \text{ for } n\geq 0 \text{ and } 1\leq i\leq K$$

and $$r_{-m}[q,t_{(n+1)K}]=r_{-m}[q,t_{nK}]-\mu[t_{(n+1)K}]f_{pc,m}[q,t_{(n+1)K}]y_{bc,-m}[q,t_{(n+1)K}]e_{pc,m}^*[q,t_{(n+1)K}/t_{nK},t_{(n+1)K}] \text{ for } n\geq 0,$$

where $f_{pc,m}$ represents a post-cancellation frequency domain equalizer (FEQ), $y_{bc,-m}$ represents equalized received vectored data, and $r_{-m}$ represents the steady-state ODMC.

4. The method of claim 1, wherein deriving an initial value for an off-diagonal multiple input multiple output canceller (ODMC) is performed while in data mode.

5. The method of claim 1, wherein deriving an initial value for an off-diagonal multiple input multiple output canceller (ODMC) is performed while in warm-up mode.

6. The method of claim 1, wherein deriving an initial value for the ODMC comprises determining a cross-correlation between error samples and received data comprising a known learning sequence.

7. The method of claim 1, wherein deriving an initial value for the ODMC comprises:
setting the initial value to zero; and
performing an adaptive algorithm to converge towards an initial value for the ODMC.

8. The method of claim 1, wherein deriving an initial value for the ODMC comprises determining a cross-correlation between error samples and detected transmit data based on received samples.

9. A method comprising:
performing a learning phase to derive both an initial off-diagonal multiple input multiple output canceller (ODMC) and a steady-state ODMC for a given tone frequency, wherein performing a learning phase comprises:
deriving an initial value for the ODMC while in data mode and while the ODMC is inactive; and
converging toward the steady-state ODMC while in data mode and the ODMC is active to maximize a distributed Shannon's capacity of the system, wherein converging comprises performing an adaptive algorithm to derive a steady state ODMC; and
passing upstream data through the steady-state ODMC to reduce self-induced far end crosstalk (self-FEXT).

10. The method of claim 9, wherein performing a learning phase further comprises performing bit loading and updating a frequency domain equalizer (FEQ) when the SNR crosses a predetermined threshold for a predetermined duration.

11. The method of claim 9, wherein performing a learning phase further comprises performing bit loading and updating a frequency domain equalizer (FEQ) when the steady state ODMC is reached.

12. The method of claim 9, further comprising maintaining the steady-state ODMC by performing the adaptive algorithm in order to maintain the maximum distributed Shannon's capacity of the system.

13. The method of claim 9, wherein deriving the initial value of the ODMC comprises determining a cross-correlation between error samples and received data comprising a known learning sequence.

14. The method of claim 9, wherein deriving the initial value of the ODMC comprises:
setting the initial value to zero; and
performing an adaptive algorithm to converge towards a steady state initial value for the ODMC.

15. The method of claim 9, wherein deriving the initial value of the ODMC comprises determining a cross-correlation between error samples and detected transmit data based on received samples.

16. A method comprising:
performing a learning phase to derive both an initial off-diagonal multiple input multiple output canceller (ODMC) and a steady-state ODMC for a given tone frequency, wherein performing a learning phase comprises:
deriving an initial value for the ODMC while in warm-up mode and while the ODMC is inactive; and
converging toward the steady-state ODMC while in data mode and the ODMC is active to maximize a distributed Shannon's capacity c the system, wherein converging comprises performing an adaptive algorithm to derive a steady state ODMC; and
passing upstream data through the steady-state ODMC to reduce self-induced far end crosstalk (self-FEXT).

17. The method of claim 16, wherein performing a learning phase further comprises performing bit loading.

18. The method of claim 16, wherein performing a learning phase further comprises performing bit loading and updating a frequency domain equalizer (FEQ) when the steady state ODMC is reached.

19. The method of claim 16, further comprising maintaining the steady-state ODMC by performing the adaptive algorithm in order to maintain the maximum distributed Shannon's capacity of the system.

20. The method of claim 16, wherein deriving the initial value of the ODMC comprises determining a cross-correlation between error samples and received data comprising a known learning sequence.

21. The method of claim 16, wherein deriving the initial value of the ODMC comprises:
setting the initial value to zero; and
performing an adaptive algorithm to converge towards a steady state initial value for the ODMC.

22. The method of claim 16, wherein deriving the initial value of the ODMC comprises determining a cross-correlation between error samples and detected transmit data based on received samples.

23. A system comprising:
initialization logic stored on a memory and executed by a processor for deriving an initial off-diagonal multiple input multiple output canceller (ODMC), wherein the logic for deriving an initial ODMC comprises logic for determining a cross-correlation between error samples and received data comprising a known learning sequence;
logic stored on the memory for deriving a steady-state ODMC from the initial ODMC to reduce self-induced far end crosstalk (self-FEXT) by utilizing an adaptive algorithm, wherein the ODMC is active; and
logic stored on the memory for performing bit loading and updating a frequency domain equalizer (FEQ) when a signal to noise ratio (SNR) of the system rises above a pre-determined value for a predetermined duration in order to maximize channel capacity.

24. A system comprising:

initialization logic stored on a memory and executed by a processor for deriving an initial off-diagonal multiple input multiple output canceller (ODMC), logic stored on the memory for deriving a steady-state ODMC from the initial ODMC to reduce self-induced far end crosstalk (self-FEXT) by utilizing an adaptive algorithm, wherein the ODMC is active, Wherein the logic for deriving an initial ODMC comprises logic for determining a cross-correlation between error samples and detected transmit data based on received samples; and logic stored on the memory for performing bit loading and updating a frequency domain equalizer (FEQ) when a signal to noise ratio (SNR) of the system rises above a pre-determined value for a predetermined duration in order to maximize channel capacity.

25. A system comprising:

initialization logic stored on a memory and executed by a processor for deriving an initial off-diagonal multiple input multiple output canceller (ODMC);

logic stored on the memory for deriving a steady-state ODMC from the initial ODMC to reduce self-induced far end crosstalk (self-FEXT) by utilizing an adaptive algorithm, wherein the ODMC is active;

logic stored on the memory for performing bit loading and updating a frequency domain equalizer (FEQ) when a signal to noise ratio (SNR) of the system rises above a pre-determined value for a predetermined duration in order to maximize channel capacity;

logic stored on the memory for maintaining the steady-state ODMC by performing the adaptive algorithm in order to maintain the maximum channel capacity.

\* \* \* \* \*